United States Patent
Clark et al.

(10) Patent No.: US 6,904,596 B1
(45) Date of Patent: Jun. 7, 2005

(54) METHOD AND APPARATUS FOR SHARED FLOW CONTROL OF DATA

(75) Inventors: Larry Lee Clark, Canal Winchester, OH (US); Michael Lawrence Denburg, Blacklick, OH (US); Stephen Ray Moore, Johnstown, OH (US); Jeffri Harold Frontz, Columbus, OH (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/577,085

(22) Filed: May 24, 2000

(51) Int. Cl.[7] ............................................... G06F 5/06
(52) U.S. Cl. ..................................... 719/310; 709/233
(58) Field of Search ............................... 719/310, 319, 719/329; 709/233, 310, 319, 329

(56) References Cited

U.S. PATENT DOCUMENTS

| | | | | |
|---|---|---|---|---|
| 5,418,912 A | * | 5/1995 | Christenson | 709/234 |
| 5,517,622 A | * | 5/1996 | Ivanoff et al. | 709/232 |
| 5,799,002 A | * | 8/1998 | Krishnan | 370/234 |
| 5,918,020 A | * | 6/1999 | Blackard et al. | 709/228 |
| 6,108,305 A | * | 8/2000 | Charny et al. | 370/232 |
| 6,130,878 A | * | 10/2000 | Charny | 370/395.41 |
| 6,208,619 B1 | * | 3/2001 | Takeuchi | 370/229 |
| 6,222,856 B1 | * | 4/2001 | Krishnan et al. | 370/468 |
| 6,292,834 B1 | * | 9/2001 | Ravi et al. | 709/233 |
| 6,385,673 B1 | * | 5/2002 | DeMoney | 709/225 |

* cited by examiner

Primary Examiner—Meng-Al T. An
Assistant Examiner—Li Zhen

(57) ABSTRACT

An apparatus and method for controlling the data rate of a stream of data between an application processes and a network, having a flow control module coupled to the applications that controls a first data rate of the stream of data. A transport layer provider is coupled to the control module for receiving the stream of data and modifying the first rate of the stream of data in response to a signal from the flow control module.

19 Claims, 6 Drawing Sheets

METHOD AND APPARATUS FOR SHARED FLOW CONTROL OF DATA

BACKGROUND OF THE INVENTION

This invention relates to communication of data, and in particular, to the upstream and downstream flow control of data.

Layered communication protocols are often implemented as a series of sequential functional layers. A well known example of such a sequential process is the seven layer Open System Interconnection (OSI) protocol model. Each software layer in the OSI model has a protocol provider that implements a portion of the overall protocol stack. A software protocol provider typically processes the data passing through its layer as fast as possible.

Traditional flow control approaches require each end of the communication link to implement a flow control mechanism. For example, the X.25 and TCP protocol providers use peer-to-peer flow control to govern the data exchange. However, the high bandwidth of the underlying transmission medium can allow a very large amount of data to be exchanged even though it is being regulated by the existing protocol layers. This high data rate can exhaust or deplete a machine's resources to the point that the machine may not be able to perform other more important tasks.

A method and apparatus to enforce additional data flow control is needed in a single flow control layer that is independently accessible (shared) by the transmitting and the receiving devices or processes.

SUMMARY OF THE INVENTION

A flow control module is placed in the streams of data as it passes between a plurality of sources from above and below the flow control module. The flow control module calculates via aggregate counters the aggregate data rate for the upstream and downstream streams of data and the individual data rate (bytes per second) via individual data rate counters associated with each stream of data in both the upstream stream direction and the downstream directions of the streams of data. The aggregate counters are compared to predetermined threshold values for the upstream and downstream data and throttled appropriately. Additionally, the individual data rate counters are each compared to a predetermined individual data rate threshold value and throttled appropriately. The flow control of data using the aggregate data rate counters and the individual data rate counters act upon the data in the upstream and downstream when the threshold values are exceeded. Furthermore, the counters are decremented at predetermined periods by a predetermined number of bytes.

BRIEF DESCRIPTION OF THE DRAWINGS

The foregoing objects and advantageous features of the invention will be explained in greater detail and others will be made apparent from the detailed description of the present invention, which is given with reference to the several figures of the drawing, in which.

DETAILED DESCRIPTION

Figure 1:
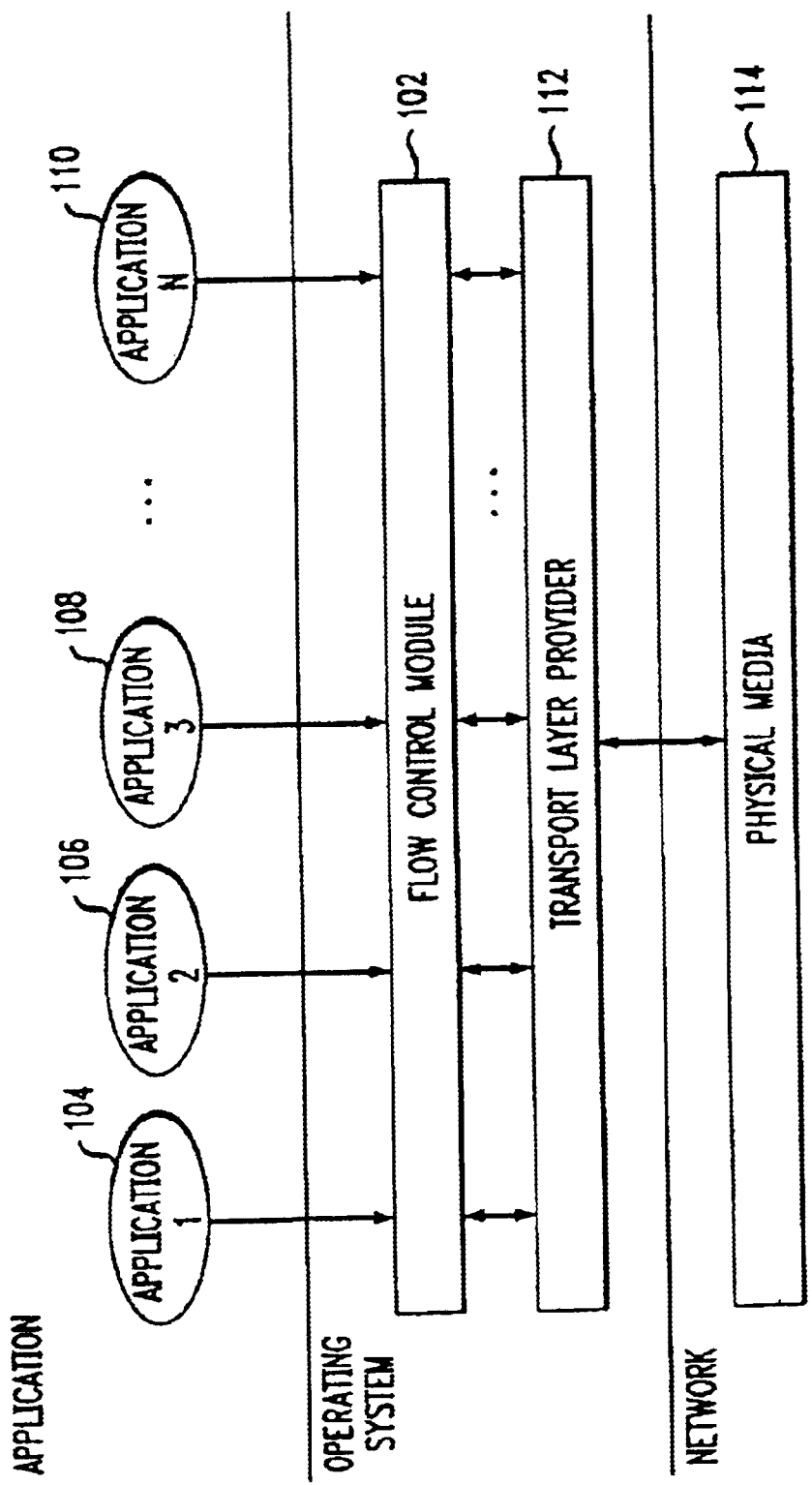
FIG. 1 illustrates a block diagram of a flow control module coupled to a plurality of applications and a protocol provider in accordance with an embodiment of the invention.

In FIG. 1, an illustration of a block diagram of a flow control module 102 coupled to a plurality of applications 104–110 and a transport layer provider 112 in accordance with an embodiment of the invention. The flow control module 102 is coupled through software to a plurality of applications, labeled "APPLICATION-1" to "APPLICATION-N", 104–110 respectively. The applications 104–110 are contained at the application software level and interface with the operating system software level. The flow control module 102 is also coupled to the transport layer provider 112 within the operating system software level. The transport layer provider 112 is coupled via software and device drivers to hardware that is connected to a physical media 114 associated with a network.

An aggregate stream of data is comprised of a plurality of individual streams of data from applications 104–110. The flow control module 102 adds to or increments an aggregate counter by the amount of data (i.e. bytes of data) that is received at the flow control module 102 per period of time (i.e. second). The aggregate counter is checked every time data is encountered by comparing the aggregate counter value to a predetermined aggregate threshold (80,000 byte). The aggregate counter is decremented by a predetermined amount every time a timer expires. The timer is set to a predetermined value, such as 1 second. If the aggregate threshold is exceeded when the aggregate counter value is checked then all streams of data from the applications 104–110 are throttled.

Similarly, the individual data rate of each stream of data that make up the combined aggregate stream of data is determined using an individual counter associated with the individual stream of data. If the individual counter exceeds a predetermined threshold value of data bytes, then the stream of data associated with the individual counter is throttled. The individual counters are decremented in a similar way as the aggregate counters. At the expiration of a timer having a predetermined period, such as one second, each of the individual counter values are decremented by a predetermined amount (8,000 bytes). The amount to decrement each individual counter can be unique for each individual counter or all individual counters can be decremented by the same value (8,000 bytes).

Furthermore, the individual and aggregate counters in the present embodiment can never go below zero. In an embodiment of the invention the UNIX operating system using the UNIX streams library may selectively be used to enable and disable data flow in response to the individual and aggregate predetermined thresholds.

The applications 104–110 are also active and may be receiving or transmitting data at the same time. As described above, the flow control module 102 has an upstream and downstream aggregate counter for counting the received and transmitted bytes from applications 104–110. When the upstream or downstream aggregate counter exceeds the associated aggregate data rate threshold for a period of time (i.e. a second), the flow control module throttles all the streams of data from the applications 104–110. Similarly, when the individual stream of data exceeds the individual data rate threshold, then the individual stream of data is throttled.

When the aggregate data rate threshold is no longer exceeded by the aggregate counter, then the throttling of the aggregate stream of data ceases, provided the individual data rate threshold is not exceeded. Similarly, the individual stream of data is unthrottled once the individual data rate for the individual stream of data no longer exceeds the individual data rate threshold.

Figure 2:
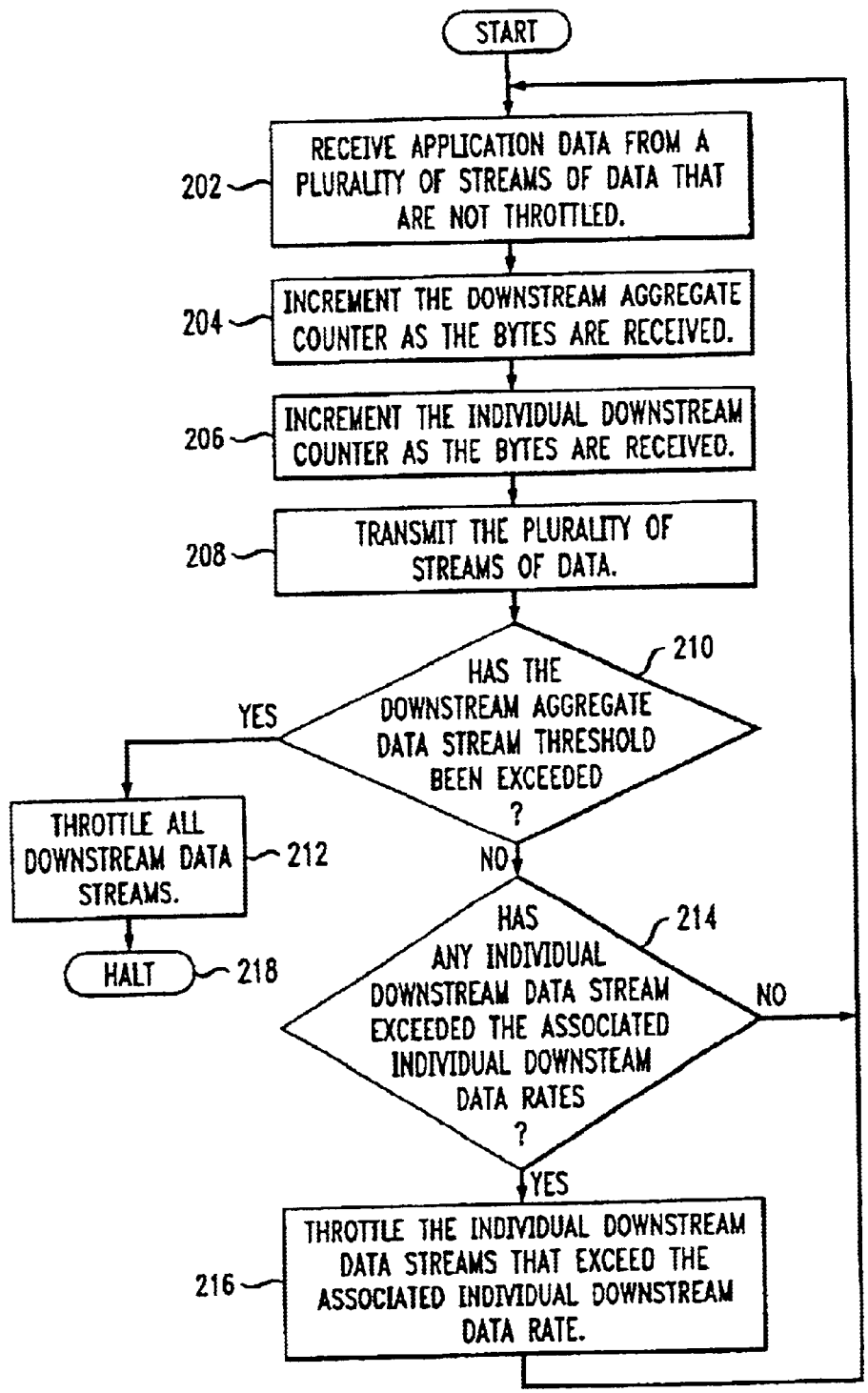
FIG. 2 is a flow diagram illustration of a method of shared flow control of streams of data in the downstream from applications to a network in accordance with an embodiment of the invention.

Turning to FIG. 2, a flow diagram illustration of a method of shared flow control of streams of data in the downstream from applications 104–110, FIG. 1, to a network in accordance with an embodiment of the invention. In step 202, FIG. 2, a plurality of streams of data are received at the flow control module 102, FIG. 1, from the applications 104–110. A downstream aggregate counter in the flow control module 102 is incremented by the amount of data (number of bytes) received in step 204, FIG. 2. Similarly, in step 206, the individual downstream counters associated with the individual downstream streams of data are incremented. In step 208, the data received in step 202 is transmitted from the flow control module 102, FIG. 1.

The downstream aggregate threshold is compared to the aggregate downstream counter in step 210, FIG. 2. If the downstream aggregate threshold has been exceeded in step 210, then in step 212 all the streams of data in the downstream direction are throttled and processing is halted in 218.

If in step 210, the downstream aggregate threshold has not been exceeded then the individual downstream counters are compared to associated individual downstream thresholds in step 214. If no individual data rate threshold is exceeded in step 214, then step 202 is repeated. If one or more of the individual data rate threshold are exceeded in step 214, then in step 216 the data streams that exceeded the individual threshold are throttled and then Step 202 is repeated.

Figure 3:
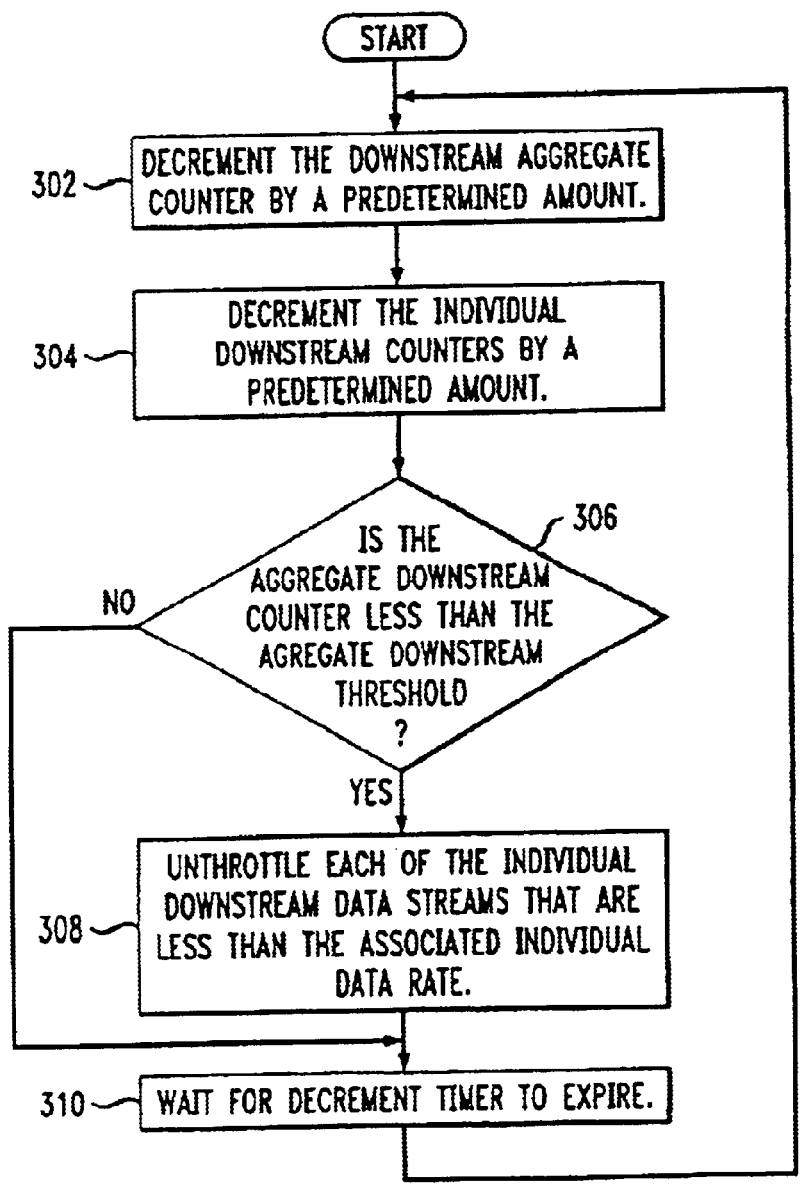
FIG. 3 is a flow diagram illustration of a method enabling streams of data in the downstream direction that have been disabled in accordance with an embodiment of the invention.

In FIG. 3, a flow diagram illustration of a method enabling streams of data in the downstream direction that have been disabled in accordance with an embodiment of the invention is shown. In step 302, the downstream aggregate counter is decremented by a predetermined amount (80,000 bytes). The individual downstream counters are decremented by a predetermined amount (8,000 bytes) in step 304. In step 306, the aggregate downstream counter is compared to the downstream aggregate threshold. If the aggregate downstream counter is less than the downstream aggregate threshold in step 306, then each of the individual downstream data streams that are less than their associated individual thresholds are unthrottled in step 308 and further processing waits for the decrement timer to expire in step 310. Otherwise, the aggregate downstream counter equals or exceeds the downstream aggregate threshold in step 306 and in step 310 processing waits for the decrement timer to expire. The decrement timer is set to a predetermined value, such as one second, upon initialization.

Figure 4:
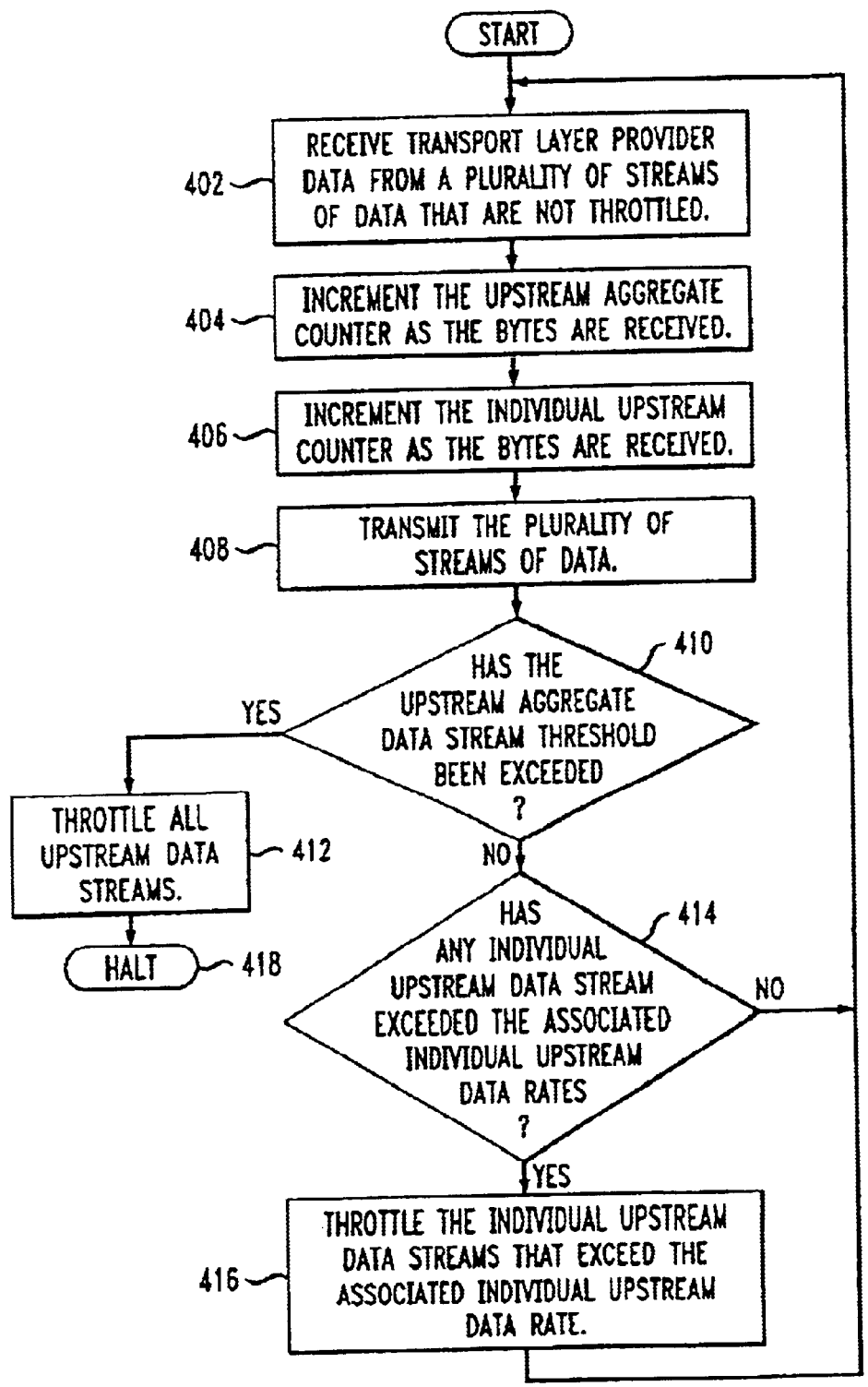
FIG. 4 is a flow diagram illustration of a method of shared flow control of streams of data in the upstream from the transport layer provider to applications in accordance with an embodiment of the invention.

In FIG. 4, a flow diagram illustration of a method of shared flow control of streams of data in the upstream from the transport layer provider 112, FIG. 1, to applications 104–110 in accordance with an embodiment of the invention is shown. In step 402, FIG. 4, a plurality of streams of data are received at 20 the flow control module 102, FIG. 1, from the transport layer provider 112. An upstream aggregate counter in the flow control module 102 is incremented by the amount of data (number of bytes) received in step 404, FIG. 4. Similarly, in step 406, the individual upstream counters associated with each of the individual upstream streams of data are incremented. In step 408, the data received in step 402 is transmitted from the flow control module 102, FIG. 1.

The upstream aggregate threshold (80,000 bytes) is compared the aggregate upstream counter in step 410, FIG. 4. If the upstream aggregate threshold has been exceeded in step 410, then in step 412 all the streams of data in the upstream are throttled and processing is halted in 418.

If in step 410, the upstream aggregate threshold has not been exceeded, then the individual upstream counters are compared to associated individual upstream thresholds in step 414. If no individual data rate threshold is exceeded in step 414, then step 402 is repeated. If one or more of the individual data rate threshold are exceeded in step 414, then in step 416 the streams of data that did exceed the threshold are throttled and step 402 is repeated.

Figure 5:
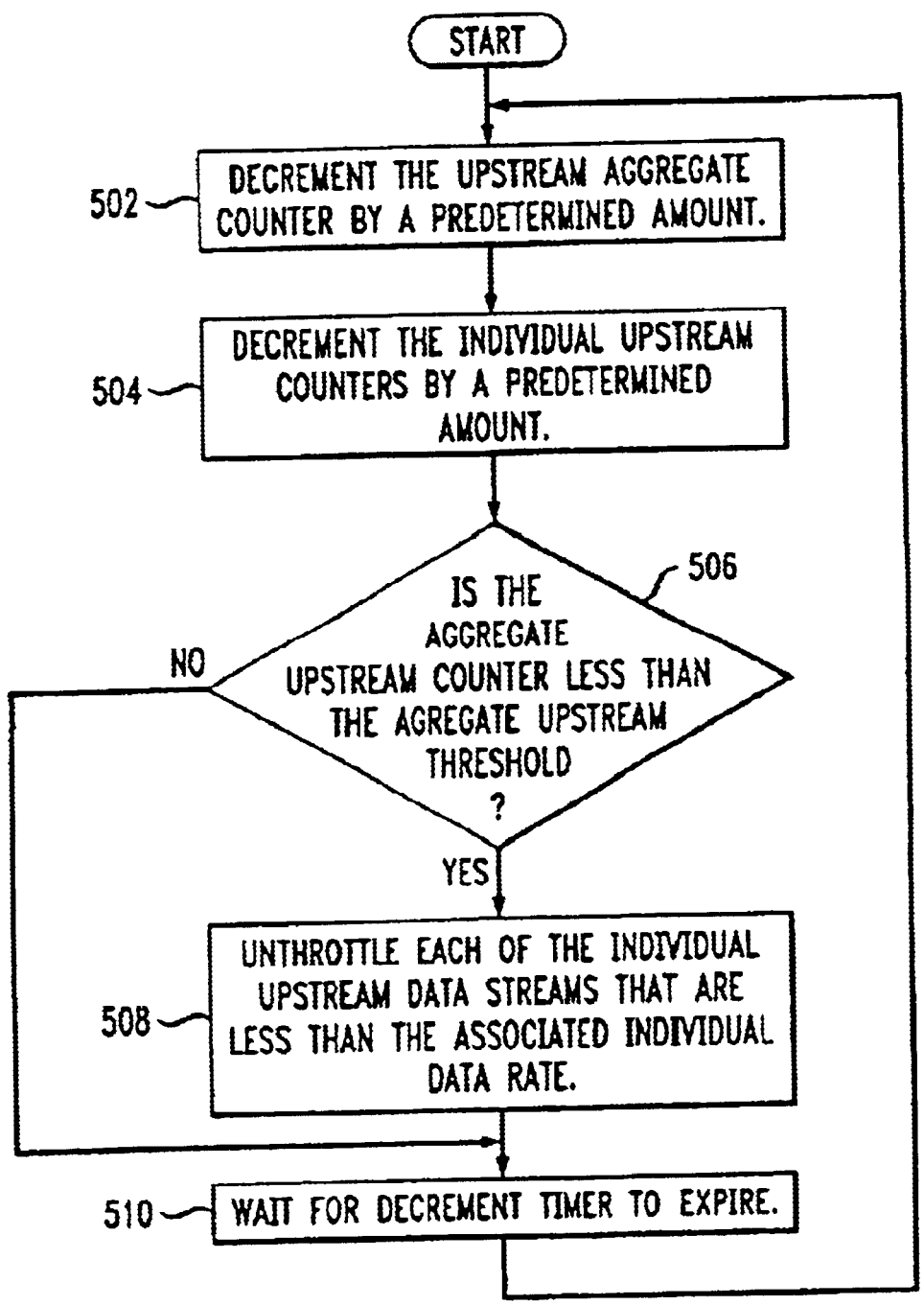
FIG. 5 is a flow diagram illustration of a method enabling streams of data in the upstream direction that have been disabled in accordance with an embodiment of the invention.

In FIG. 5, a flow diagram illustration of a method enabling streams of data in the upstream direction that have been disabled in accordance with an embodiment of the invention is shown. In step 502, the upstream aggregate counter is decremented by a predetermined amount (80,000 bytes). Similarly, the individual upstream counters are decremented by a predetermined amount (8,000 bytes) in step 504. In step 506, the aggregate upstream counter is compared to the upstream aggregate threshold. If the aggregate upstream counter is less than the upstream aggregate threshold in step 506, then each of the individual upstream streams of data that are less than their associated individual data rate are unthrottled in step 508 and further processing waits for the decrement timer to expire in step 510. Otherwise, the aggregate upstream counter equals or exceeds the upstream aggregate threshold in step 506, then in step 510, processing waits for the decrement timer to expire. The decrement timer is set to a predetermined value, such as one second, upon initialization.

The steps illustrated in FIG. 2 through FIG. 5 may selectively be implemented by computer-readable program code (i.e. UNIX with "C" or "C++") or in integrated circuits. The computer-readable program code is contained in an article of manufacture such as a compact disk read only memory (CD ROM), floppy disk, magnetic tape, or programmable chip (i.e. PROM, EEPROM, or EPROM).

Figure 6:
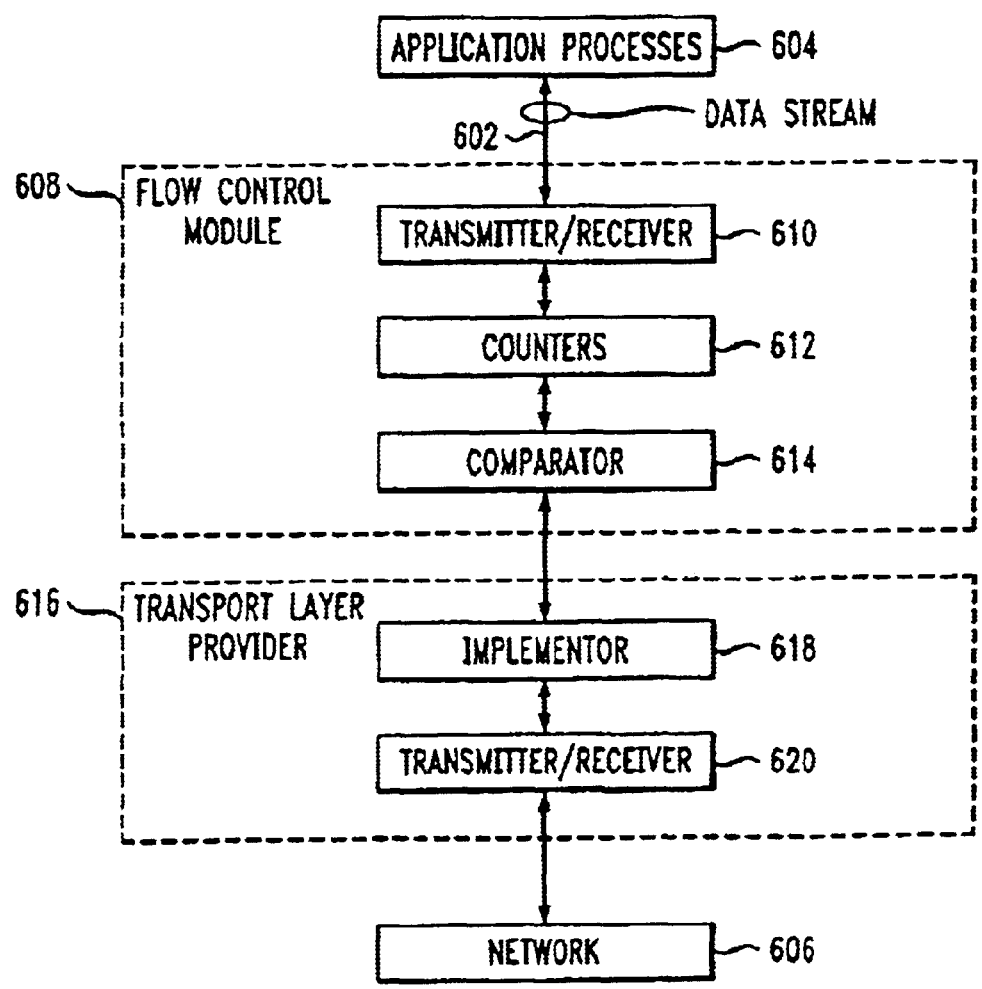
FIG. 6 is a system block diagram of a application process and a network communicating in accordance with an embodiment of the invention.

In FIG. 6, a system block diagram of a application process and a network communicating is shown. The communication flows to and from the network. A plurality of data streams 602 between applications 604 and a network 606 pass (in both the upstream and downstream) through a flow control module 608 having a transmitter/receiver 610, a counter 612, and a comparator 614. The data stream 602 also passes through a transport layer provider 416 having an implementor 618 and another transmitter/transmitter 620.

A data stream 402 between the application processes 604 and the network 606 have a data rate that is calculated in the flow 5 control module 608. The flow control module 608 receives the data stream at the transmitter/receiver 610 and counters 612 having an upstream aggregate counter and downstream aggregate counter determine the data rate for the aggregate stream of data. The upstream and downstream aggregate counters are compared to an aggregate data rate threshold by the comparator 614. In an alternate embodiment, multiple data streams each have an associated data rate threshold that is calculated by an individual upstream counter and individual downstream counter. The individual counters are compared by the comparator 614 to an individual data rate threshold.

If either of the thresholds (aggregate or individual) is exceeded, then the data rate of a stream of data is throttled. The flow control module 608 signals to the implementor 618 via a signal (electrical or software) to throttle the data dream. The implementor 618 in the transport layer provider 616 then throttles the data rate of the stream of data that is being sent to the network 606 by the other transmitter/receiver 620. Therefore, the machine resources are conserved by managing the data flow per unit of time with a shared flow control module 608.

While the invention has been particularly shown and described with reference to a particular embodiment, it will be understood by those skilled in the art that various changes in form and details may be made therein without departing from the spirit and scope of the invention and it is intended that all such changes come within the scope of the following claims.

What is claimed is:

1. A method of shared flow control of data between a transport layer interface provider and at least one application comprising the steps of:

receiving from the at least one application a stream of data having a first aggregate downstream data rate, wherein the stream of data is made up of a plurality of streams of data;

measuring the first aggregate downstream data rate of the stream of data;

transmitting the stream of data to the transport layer interface provider;

deciding, independent of the at least one application and the transport layer interface provider, to throttle the stream of data; and throttling the stream of data from the first aggregate downstream data rate to a second aggregate downstream data rate;

wherein the step of measuring further comprises the step of counting with an aggregate downstream counter an amount of received data from the stream of data;

wherein the step of counting further comprises the steps of incrementing the aggregate downstream counter by the amount of received data, and decrementing the aggregate downstream counter by a predetermined amount at a predetermined interval of time.

2. The method of claim 1 in which the step of throttling further comprises the steps of comparing the aggregate downstream counter to a predetermined downstream aggregate threshold, and notifying the transport layer interface provider to throttle the plurality of streams of data.

3. The method of claim 1 in which the step of measuring further comprises the steps of identifying an individual downstream stream of data from the plurality of streams of data, and counting from the individual downstream stream of data an individual amount of received data with an individual downstream counter associated with the individual downstream stream of data.

4. The method of claim 3 in which the step of counting further comprises the steps of incrementing the individual downstream counter by the individual amount of received data, and decrementing the individual downstream counter by a predetermined individual amount at a predetermined interval of time.

5. The method of claim 3 in which the step of measuring further comprises the step of comparing the individual downstream counter to a predetermined individual downstream threshold.

6. The method of claim 1 in which the step of throttling further comprises the step of executing UNIX stream functions to throttle the stream of data.

7. The method of claim 1, wherein the method further comprises:

calculating, in a flow control module that has upstream and downstream individual counters, a respective individual data rate for each data stream in the plurality of data streams;

comparing, in the flow control module, at least one of the upstream and downstream individual counters to the respective individual data rate threshold to determine if the respective individual data rate threshold has been exceeded by the respective individual data rate of a respective data stream of the plurality of data streams; and throttling, if the respective individual data rate threshold has been exceeded by the respective individual data rate, the respective individual data stream from the respective individual data rate to a further individual data rate.

8. A method of shared flow control of data between a transport layer interface provider and at least one application comprising the steps of:

receiving from the transport layer interface provider a stream of data having a first aggregate upstream data rate, wherein the stream of data is made up of a plurality of streams of data;

measuring the first aggregate upstream data rate of the stream of data;

transmitting the stream of data to the at least one application;

deciding, independent of the at least one application and the transport layer interface provider, to throttle the stream of data; and throttling the stream of data from the first aggregate upstream data rate to a second aggregate upstream data rate;

wherein the step of measuring further comprises the step of counting with an aggregate upstream counter an amount of received data from the stream of data;

wherein the step of counting further comprises the steps of incrementing the aggregate upstream counter by the amount of received data, and decrementing the aggregate upstream counter by a predetermined amount at a predetermined interval of time.

9. The method of claim 8 in which the step of throttling further comprises the steps of comparing the aggregate upstream counter to a predetermined downstream aggregate threshold, and notifying the transport layer interface provider to throttle the plurality of streams of data.

10. The method of claim 8 in which the step of measuring further comprises the steps of identifying an individual upstream stream of data from the plurality of streams of data, and counting from the individual upstream stream of data an individual amount of received data with an individual upstream counter associated with the individual upstream stream of data.

11. The method of claim 10 in which the step of counting further comprises the steps of incrementing the individual upstream counter by the individual amount of received data, and decrementing the individual upstream counter by a predetermined individual amount at a predetermined interval of time.

12. The method of claim 10 in which the step of measuring further comprises the step of comparing the individual upstream counter to a predetermined upstream individual threshold.

13. The method of claim 8 in which the step of throttling further comprises the step of executing UNIX stream functions to throttle the stream of data.

14. A computer-readable signal bearing medium having computer-readable program code means embodied therein for shared data flow control of data, the computer-readable program code, comprising:
  means having computer-readable program code for receiving from at least one application a stream of data having a first aggregate downstream data rate, wherein the stream of data is made up of a plurality of streams of data,
  means having computer-readable program code for measuring the first aggregate downstream data rate of the stream of data,
  means having computer-readable program code for transmitting the stream of data to a transport layer interface provider,
  means having computer-readable program code for deciding, independent of the at least one application and the transport layer interface provider, to throttle the stream of data,
  means having computer-readable program code for throttling the stream of data from the first aggregate downstream data rate to a second aggregate downstream data rate,
  means having computer-readable program code for counting with an aggregate downstream counter an amount of received data from the stream of data, and
  means having computer-readable program code for incrementing the aggregate downstream counter by the amount of received data, and means having computer-readable program code for decrementing the aggregate downstream counter by a predetermined amount at a predetermined interval of time.

15. A computer-readable signal-bearing medium of claim 14 further comprising means having computer-readable program code for comparing the aggregate downstream counter to a predetermined downstream aggregate threshold, and means having computer-readable program code for notifying the transport layer interface provider to throttle the plurality of streams of data.

16. A computer-readable signal bearing medium having computer-readable program code means embodied therein for shared data flow control of data, the computer-readable program code, comprising:
  means having computer-readable program code for receiving from a transport layer interface provider a stream of data having a first aggregate upstream data rate, wherein the stream of data is made up of a plurality of streams of data,
  means having computer-readable program code for measuring the first aggregate upstream data rate of the stream of data,
  means having computer-readable program code for transmitting the stream of data to at least one application,
  means having computer-readable program code for deciding, independent of the at least one application and the transport layer interface provider, to throttle the stream of data,
  means having computer-readable program code for throttling the stream of data from the first aggregate upstream data rate to a second aggregate upstream data rate,
  means having computer-readable program code for counting with an aggregate upstream counter an amount of received data from the stream of data, and
  means having computer-readable program code for incrementing the aggregate upstream counter by the amount of received data, and means having computer-readable program code for decrementing the aggregate upstream counter by a predetermined amount at a predetermined interval of time.

17. A computer-readable signal-bearing medium of claim 16 further comprising means having computer-readable program code for comparing the aggregate upstream counter to a predetermined downstream aggregate threshold, and means having computer-readable program code for notifying the transport layer interface provider to throttle the plurality of streams of data.

18. A method of shared flow control of data streams, flowing in both upstream and downstream directions, between a transport layer interface provider and at least one application, comprising the steps of:
  passing a plurality of data streams through a flow control module that is located between the at least one application and the transport layer interface provider, an aggregate data stream being formed by the plurality of data streams;
  calculating, in the flow control module that has upstream and downstream aggregate counters, an aggregate data rate for the aggregate data stream from the plurality of data streams in a respective one of the upstream and downstream directions;
  comparing, in the flow control module that has a comparator, at least one of the upstream and downstream aggregate counters to the aggregate data rate threshold to determine if the aggregate data rate threshold has been exceeded by the aggregate data rate of the aggregate data stream;
  wherein the flow control module is independent of the at least one application and the transport layer interface provider; and throttling, if the aggregate data rate threshold has been exceeded by the aggregate data rate of the aggregate data stream, all of the data streams in the plurality of data streams from the aggregate data rate to another aggregate data rate.

19. A method of shared flow control of data streams, flowing in both upstream and downstream directions, between a transport layer interface provider and at least one application, comprising the steps of:
  passing a plurality of data streams through a flow control module that is located between the at least one application and the transport layer interface provider, an aggregate data stream being formed by the plurality of data streams;
  calculating, in the flow control module that has upstream and downstream aggregate counters, an aggregate data rate for the aggregate data stream from the plurality of data streams in a respective one of the upstream and downstream directions;
  calculating, in the flow control module that has upstream and downstream individual counters, a respective individual data rate for each data stream in the plurality of data streams;

comparing, in the flow control module that has a comparator, at least one of the upstream and downstream aggregate counters to the aggregate data rate threshold to determine if the aggregate data rate threshold has been exceeded by the aggregate data rate of the aggregate data stream;

comparing, in the flow control module, at least one of the upstream and downstream individual counters to the respective individual data rate threshold to determine if the respective individual data rate threshold has been exceeded by the respective individual data rate of a respective data stream of the plurality of data streams;

wherein the flow control module is independent of the at least one application and the transport layer interface provider;

throttling, if the aggregate data rate threshold has been exceeded by the aggregate data rate, all of the data streams in the plurality of data streams from the aggregate data rate to another aggregate data rate; and throttling, if the respective individual data rate threshold has been exceeded by the respective individual data rate, the respective individual data stream from the respective individual data rate to a further individual data rate;

wherein, when the aggregate data rate threshold is no longer exceeded by the aggregate data rate, then the throttling of the data stream ceases, provided the individual data rate threshold is not exceeded, and wherein the respective individual data stream is unthrottled once the respective individual data rate for the individual data stream no longer exceeds the individual data rate threshold.

* * * * *